(12) United States Patent
Egger et al.

(10) Patent No.: US 12,274,266 B2
(45) Date of Patent: Apr. 15, 2025

(54) SOLID FORMULATION OF INSECTICIDAL MIXTURES

(71) Applicant: Bayer Aktiengesellschaft, Leverkusen (DE)

(72) Inventors: Holger Egger, Cologne (DE); Reiner Fischer, Monheim (DE); Laura Zumsande, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 327 days.

(21) Appl. No.: 17/046,889

(22) PCT Filed: Apr. 12, 2019

(86) PCT No.: PCT/EP2019/059474
§ 371 (c)(1),
(2) Date: Oct. 12, 2020

(87) PCT Pub. No.: WO2019/197634
PCT Pub. Date: Oct. 17, 2019

(65) Prior Publication Data
US 2021/0360925 A1 Nov. 25, 2021

(30) Foreign Application Priority Data
Apr. 13, 2018 (EP) .................. 18167264

(51) Int. Cl.
*A01N 43/90* (2006.01)
*A01N 25/14* (2006.01)

(52) U.S. Cl.
CPC ............ *A01N 43/90* (2013.01); *A01N 25/14* (2013.01)

(58) Field of Classification Search
CPC .............................. A01N 43/90; A01N 25/14
See application file for complete search history.

(56) References Cited

U.S. PATENT DOCUMENTS

| | | |
|---|---|---|
| 2003/0008949 A1 | 1/2003 | Devisetty et al. |
| 2011/0086762 A1 | 4/2011 | Fischer et al. |
| 2019/0202837 A1 * | 7/2019 | Himmler .............. C07D 317/72 |

FOREIGN PATENT DOCUMENTS

| | | | |
|---|---|---|---|
| CN | 101410018 A | 4/2009 | |
| CN | 101568256 A | 10/2009 | |
| CN | 101977916 A | 2/2011 | |
| CN | 103371160 A | 10/2013 | |
| CN | 106719738 A | 5/2017 | |
| EP | 1377163 A2 | 1/2004 | |
| EP | 2103615 A1 | 9/2009 | |
| JP | 2004528322 A | 9/2004 | |
| JP | 2010539203 A | 12/2010 | |
| JP | 2011515352 A | 5/2011 | |
| JP | 2013502387 A | 1/2013 | |
| JP | 2013510895 A | 3/2013 | |
| JP | 2014504641 A | 2/2014 | |
| JP | 2014512370 A | 5/2014 | |
| JP | 2016522201 A | 7/2016 | |
| KR | 20000070657 A | 11/2000 | |
| KR | 20070004000 A | 1/2007 | |
| WO | 9834483 A1 | 8/1998 | |
| WO | 02082902 A2 | 10/2002 | |
| WO | 2005084441 A2 | 9/2005 | |
| WO | 2007126691 A2 | 11/2007 | |
| WO | 2009039951 A2 | 4/2009 | |
| WO | 2009086739 A1 | 7/2009 | |
| WO | 2009086793 A1 | 7/2009 | |
| WO | 2009115262 A1 | 9/2009 | |
| WO | WO-2010126583 A1 * | 11/2010 | ............. A01N 25/00 |
| WO | 2011020567 A1 | 2/2011 | |
| WO | 2011061156 A1 | 5/2011 | |
| WO | 2012106487 A1 | 8/2012 | |
| WO | 2012143125 A1 | 10/2012 | |
| WO | WO-2013159731 A1 * | 10/2013 | ............. A01N 25/12 |
| WO | 2014079719 A1 | 5/2014 | |
| WO | WO-2014187846 A1 * | 11/2014 | ............. A01N 25/32 |
| WO | WO-2015034359 A2 * | 3/2015 | ............. A01N 25/04 |

OTHER PUBLICATIONS

International Search Report for Application No. PCT/EP2019/059474 mailed Jun. 21, 2019.

* cited by examiner

Primary Examiner — Robert A Wax
Assistant Examiner — John Seungjai Kwon (57) ABSTRACT

The invention relates to solid formulations (especially water-soluble granules (SG)) of insecticide active tetramic acid derivatives, to a process for production thereof and to the use thereof for application of the active ingredients present, especially for drip & drench applications.

10 Claims, 2 Drawing Sheets

SOLID FORMULATION OF INSECTICIDAL MIXTURES

CROSS-REFERENCE TO RELATED APPLICATIONS

This application is the National Stage entry of International Application No. PCT/EP2019/059474, filed 12 Apr. 2019, which claims priority to European Patent Application No. 18167264.3, filed 13 Apr. 2018.

BACKGROUND

Field

The invention relates to solid formulations (especially water-soluble granules (SG)) of insecticide active tetramic acid derivatives, to a process for production thereof and to the use thereof for application of the active ingredients present, especially for drip & drench applications.

Description of Related Art

SL formulations (soluble concentrates) of tetramic acid derivatives are known from the prior art, for example from WO 2009/115262, but these have the disadvantage that the concentration of the active ingredient in the concentration is often only low, and so large volumes are needed for transport, processing and storage. Furthermore, in the case of highly concentrated solutions, there is the risk of oversaturation, such that there can be precipitation of ingredients and hence the storage stability of the product affected.

Moreover, SC formulations (suspension concentrates) of these compounds are known, but these often have poor or only very slow solubility of the active ingredients (ai) and ingredients, which is likewise true of WG formulations (water-dispersible granules) which additionally contain insoluble fillers.

When employed in spray equipment and irrigation systems which generally include hoses of low diameter and nozzles, especially in the case of the WGs, but also in the case of the other formulation types including water insoluble substances, there is frequently blockage of these hoses and nozzles by undissolved or precipitated material, whether active ingredient or auxiliary.

SUMMARY

It was therefore an object of the present invention to provide rapidly soluble, highly concentrated formulations of the tetramic acid derivatives according to the invention, from which a ready-to-use formulation can be produced in a residue-free manner. Moreover, the salt burden of the soil was to be reduced and, optionally, the further constituents of the formulation were to act as fertilizer/nutrient.

The invention therefore provides insecticidal compositions in the form of water-soluble granules (SG) comprising:
a. as component a tetramic acid derivatives of the formula (I)

in which
W and Y are independently hydrogen, C1-C4-alkyl, chlorine, bromine, iodine or fluorine,
X is C1-C4-alkyl, C1-C4-alkoxy, chlorine, bromine or iodine,
A, B and the carbon atom to which they are bonded are C3-C6-cycloalkyl substituted by an optionally C1-C4-alkyl- or C1-C4-alkoxy-C1-C2-alkyl-substituted alkylenedioxy group that forms a 5-membered or 6-membered ketal together with the carbon atom to which it bonded,
G is hydrogen (a) or is one of the groups in which
E is a metal ion or an ammonium ion,
M is oxygen or sulfur,
R1 is straight-chain or branched C1-C6-alkyl,
R2 is straight-chain or branched C1-C6-alkyl.
b. at least one base, preferably an inorganic base, further preferably an alkali metal hydroxide (component b),
c. at least one dispersant, preferably selected from the group of the lignosulfonates and salts thereof,
d. optionally at least one wetting agent,
e. optionally at least one water-soluble filler, and
f. optionally further water-soluble or liquid active ingredients and adjuvants.

The dispersant is preferably a basic dispersant, i.e. preferably having a pH$>=8$, further preferably $>=10$, in aqueous solution (measured by glass electrode in 15% solution at 25° C.).

Usable with specific preference in the aforementioned compositions are tetramic acid derivatives of the abovementioned formula (I) with G=hydrogen (a).

Likewise most preferably used are tetramic acid derivatives of the formula (I) mentioned above where G=E (d).

BRIEF DESCRIPTION OF THE DRAWINGS

For a further understanding of the nature, object, and advantages of the present disclosure, reference should be had to the following detailed description, read in conjunction with the following drawings, wherein like reference numerals denote like elements.

DETAILED DESCRIPTION OF A PREFERRED EMBODIMENT

In a preferred embodiment, the invention provides an insecticidal composition in the form of water-soluble granules (SG) comprising:

a. compounds of the formula (I)

where the compounds of the formula (I) have the following definitions:
W is methyl,
X is chlorine or methyl,
Y is chlorine, bromine or methyl,
A, B and the carbon atom to which they are bonded are saturated C6-cycloalkyl substituted by an alkylenedioxy group which, together with the carbon atom to which it is bonded, forms a 5-membered or 6-membered ketal,
G is hydrogen (a) or is one of the groups in which
M is oxygen,
E is one metal ion equivalent or an ammonium ion,
$R^1$ is straight-chain or branched $C_1$-$C_4$-alkyl,
$R^2$ is straight-chain or branched $C_1$-$C_4$-alkyl.
b. at least one base (component b) selected from the group comprising LiOH, KOH and NaOH,
c. at least one dispersant selected from the group of the lignosulfonates and salts thereof consisting of Borresperse NA, Borresperse 3A, Ultrazine NA, Ufoxane 3A, Vanisperse CB, Marasperse AG, MARASPERSE N 22, MARASPERSE C 21, MARASPERSE CBOS-4, WAFEX CA122 and Borresperse CA from Borregaard; KRAFTSPERSE EDF-350, KRAFTSPERSE 25M, KRAFTSPERSE EDF-450, REAX 100M, REAX 83A, REAX 85A, REAX 88A, REAX 88B, REAX 907, REAX 910, POLYFON H, POLYFON O and POLYFON T from Ingevity; AGRINOL DN 19 and Agrinol C12 from Tembec,
d. at least one wetting agent selected from the group consisting of the sodium salts of alkylated naphthalenesulfonates, for example ®Morwet EFW, and the sodium salts of dioctylsulfosuccinic acid, for example ®Aerosol OTB, and block polymer of propylene oxide and ethylene oxide on ethylenediamine, for example ®Synperonic T 905,
e. optionally at least one water-soluble filler, and
f. optionally further water-soluble or liquid active ingredients and adjuvants.

In a further-preferred embodiment, the invention provides an insecticidal composition in the form of water-soluble granules (SG) comprising:
a. compound of the formula (I) selected from the following compounds:

I)

b. at least one base (component b) selected from the group comprising KOH and NaOH,
c. at least one dispersant selected from the group of the lignosulfonates and salts thereof consisting of REAX 88B, Reax 100M,
d. at least one wetting agent selected from the group consisting of the sodium salts of alkylated naphthalenesulfonates, for example ®Morwet EFW, and the sodium salts of dioctylsulfosuccinic acid, for example ®Aerosol OTB,
e. at least one water-soluble filler selected from the group comprising readily soluble inorganic salts, sugars and urea derivatives, preferably selected from the group comprising potassium sulfate, phosphoric salts of the $M_3PO_4$ form where M is preferably an ammonium or alkali metal cation, further preferably ammonium, Na or K; lactose, maltodextrin and urea,
f. optionally further water-soluble or liquid active ingredients and adjuvants.

In a particularly preferred embodiment, the invention provides an insecticidal composition in the form of water-soluble granules (SG) comprising:

a. compound having the formula (I-2) having the following structure:

(I)

(I-2)

b. KOH as base (component b),
c. REAX 88B (CAS No. 68512-34-5) as basic dispersant from the group of the lignosulfonates,
d. a wetting agent selected from the group consisting of the sodium salts of alkylated naphthalenesulfonates, preferably ®Morwet EFW (CAS No. 26264-58-4),
e. at least one water-soluble filler selected from the group comprising sugars and readily soluble organic salts, preferably potassium sulfate, potassium phosphate, lactose and maltodextrin, more preferably lactose,
f. optionally further water-soluble or liquid active ingredients and adjuvants.

Usable with specific preference in the aforementioned compositions are tetramic acid derivatives of the abovementioned formula (I) with G=hydrogen (a).

Likewise most preferably used are tetramic acid derivatives of the formula (I) mentioned above where G=E (d).

Compound I-2 is preferably used in the form of its most thermodynamically stable polymorphous structure. This crystal structure and further physical data were determined as follows:

Sample Preparation:

Compound I-2 ($C_{19}H_{22}ClNO_4$/MW=363.84 g/mol) was crystallized from methanol and dried at room temperature, giving modification A.

Figure 1:
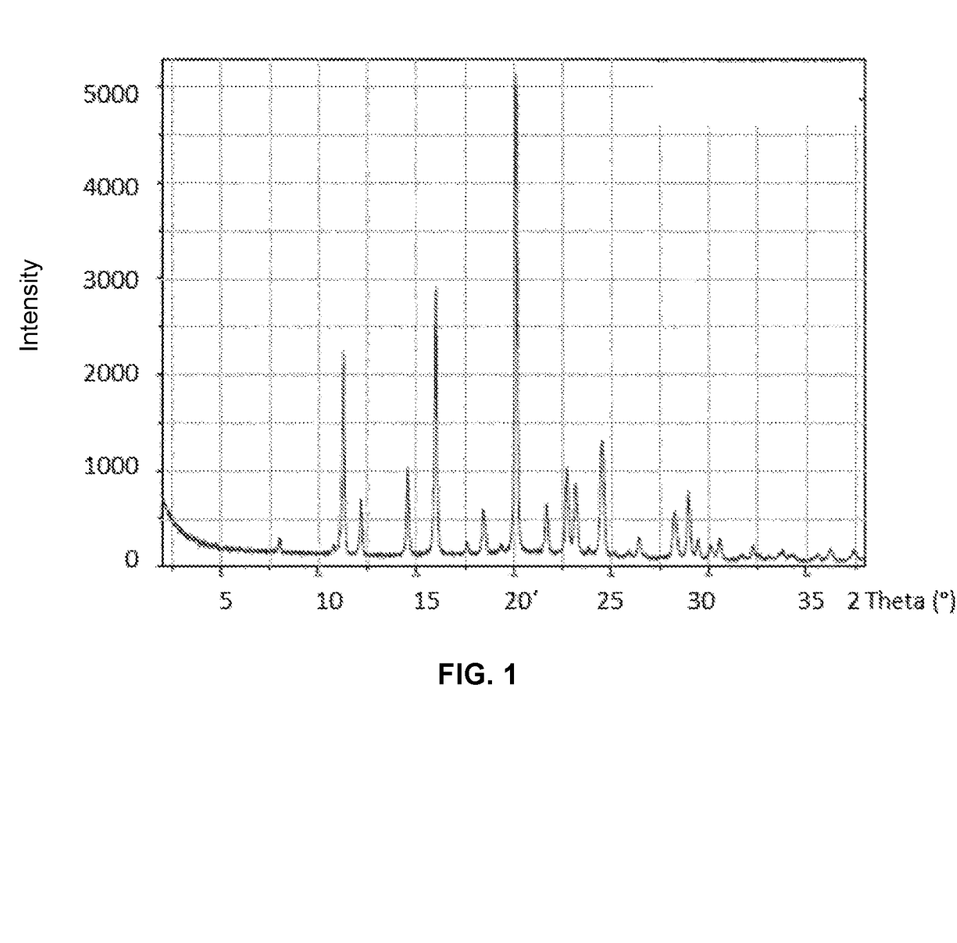
FIG. 1 shows an x-ray diffraction pattern of compound I-2 (modification A).

Modification A of I-2 can be characterized by x-ray powder diffractometry based on the corresponding diffraction diagrams that were recorded at 25° C. and with Cu-Kα 1 radiation (1.5406 Å) (FIG. 1).

Modification A according to the present invention shows at least 3, preferably at least 5, further preferably at least 7, even further preferably at least 10 and most preferably all reflections as shown in FIG. 1:

Modification A according to the present invention is further characterized by the x-ray diffraction diagram shown in Figure I.

Crystallographic studies on single crystals of modification A showed that the crystal structure is monoclinic. The unit cell has the $P2_1/c$ space group.

TABLE 2

Crystallographic properties of modification A

| Parameter | Modification A |
| --- | --- |
| Crystal system | monoclinic |
| Space group | $P2_1/c$ |

TABLE 2-continued

Crystallographic properties of modification A

| Parameter | Modification A |
| --- | --- |
| a in Å | 11.66544(14) |
| b in Å | 9.50603(10) |
| c in Å | 16.66907(19) |
| α | 90 |
| β | 110.2045(13) |
| γ | 90 |
| Z | 4 |
| Density (calculated) | 1.393 g/cm³ | a, b, c = length of the sides of the unit cell
α, β, γ = angles in the unit cell
Z = number of molecules in the unit cell TABLES 2a/b Crystallographic data/reflections [°2theta] of modification A

| 2a Reflections [°2theta] Modification A | 2b Reflections [°2theta] Modification A |
| --- | --- |
| 11.3 | 8.0 |
| 14.6 | 10.8 |
| 16.0 | 11.3 |
| 20.1 | 12.2 |
| 21.7 | 14.6 |
| 22.7 | 16.0 |
| 23.1 | 17.6 |
| 24.5 | 18.4 |
| 28.2 | 19.4 |
| 29.0 | 20.1 |
| | 21.7 |
| | 22.7 |
| | 23.1 |
| | 23.8 |
| | 24.5 |
| | 25.9 |
| | 26.4 |
| | 28.2 |
| | 29.0 |
| | 29.4 |
| | 30.1 |
| | 30.6 |
| | 32.2 |
| | 36.2 |
| | 37.4 |
| | 38.2 |
| | 39.1 |

Figure 2:
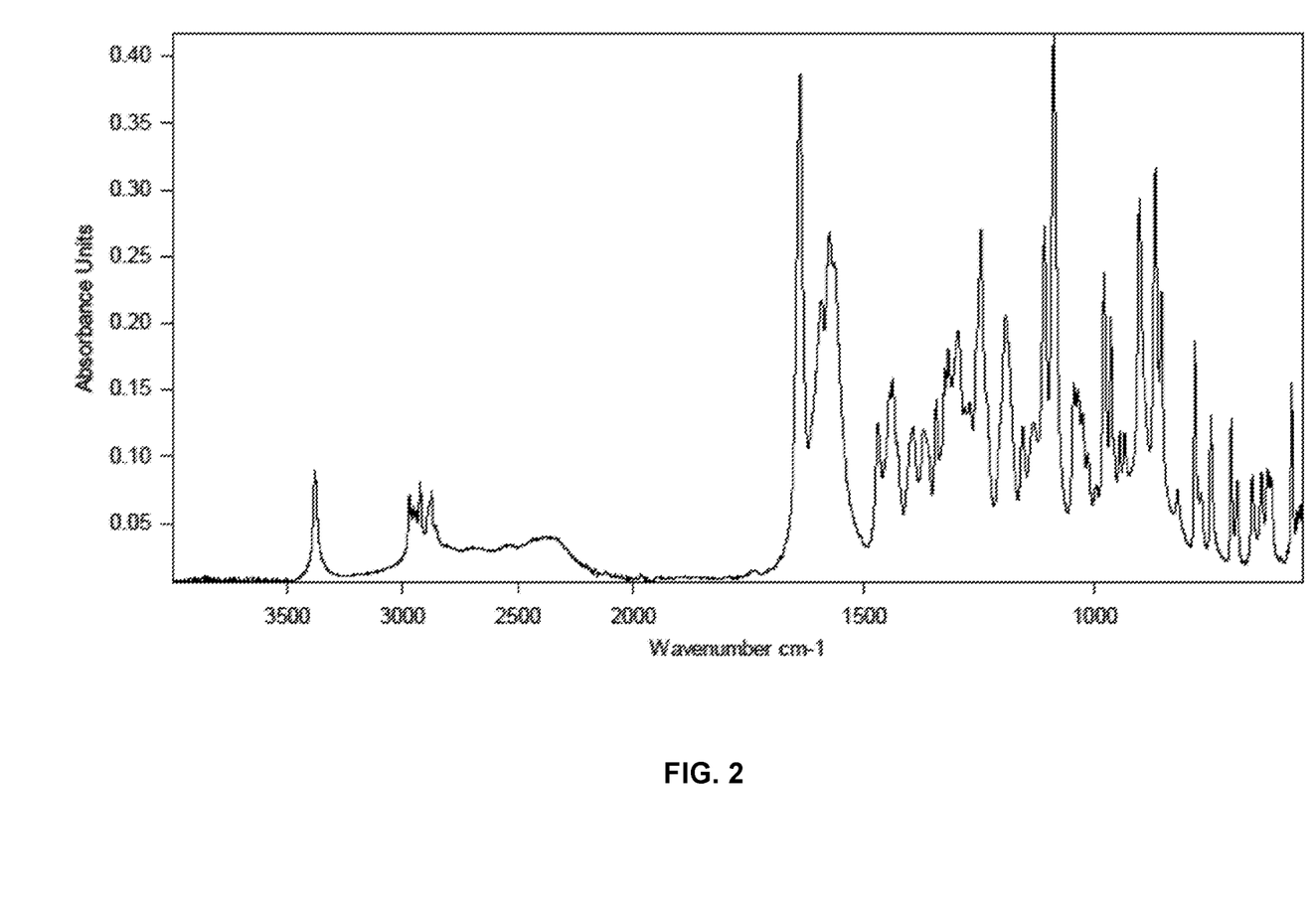
FIG. 2 shows and IR spectrum of compound I-1 (modication A).

The polymorphic form of modification A of I-1 can be determined by IR spectroscopy from the corresponding spectrum which was recorded at 25° C. using a diamond ATR instrument at a resolution of 4 cm⁻¹ (FIG. 2). Modification A of the present invention shows at least 3, preferably at least 5, further preferably at least 7 and more preferably all bands, as can be seen in FIG. 2 and as described in table 2c.

TABLE 2c)

IR bands [cm⁻¹]

| Band maximum [cm⁻¹] Modification A | Band maximum [cm⁻¹] |
| --- | --- |
| 3378 | 1133 |
| 2969 | 1109 |
| 2955 | 1088 |
| 2943 | 1045 |
| 2924 | 1036 |

TABLE 2c)-continued

IR bands [cm$^{-1}$]

| Band maximum [cm$^{-1}$] Modification A | Band maximum [cm$^{-1}$] |
|---|---|
| 2876 | 1027 |
| 2858 | 1015 |
| 2326 | 997 |
| 1637 | 980 |
| 1592 | 965 |
| 1575 | 946 |
| 1564 | 936 |
| 1470 | 903 |
| 1444 | 869 |
| 1438 | 856 |
| 1428 | 821 |
| 1394 | 783 |
| 1372 | 769 |
| 1344 | 748 |
| 1325 | 704 |
| 1317 | 691 |
| 1297 | 659 |
| 1272 | 639 |
| 1247 | 625 |
| 1194 | 573 |
| 1157 | 563 |
|  | 553 |

In addition to the above-described modification A, compound I-2 may be present in further polymorphous forms and also pseudopolymorphous forms (hydrates, solvates, etc.).

In a preferred embodiment, the equivalents ratio of active ingredient to base (component (a) to (b)) is preferably in the range from 0.7:1.0 to 1.0:0.7, further preferably in the range from 1.0:1.0 to 1.0:0.8 and more preferably in the range from 1.0:1.0 to 1.0:0.9.

In the present invention, in formulae, e.g. formula (I), optionally substituted radicals, unless stated otherwise, may be mono- or poly substituted, where the substituents in the case of polysubstitutions may be the same or different.

Moreover, in the ranges of preference stated in the present invention, the different levels of preference should be understood such that they can be combined with one another in permutations, but in any case identical levels of preference and especially the most preferred embodiment/level of preference in each case are to be combined with one another and are indeed disclosed as such a combination.

Compositions as described above that consist solely of the essential components (not optional components) should likewise be considered to be disclosed.

With regard to component a, it is of course possible to prepare compositions having a lower active ingredient content than 50% by weight, although preference is given to a high active ingredient content for the application (transport volume, handling, economics). It is also familiar to the person skilled in the art that the proportion of the base as a percentage by weight can vary with the type of base used, depending on its molecular weight.

Solids contents—unless stated otherwise—should be regarded as percentages by weight, where the solids contents of the compositions should add up to 100. Moreover, the proportions in the case of added solutions (e.g. base) indicate the proportions of the solutions, and so, for example, the proportion of pure KOH in the case of a 50% solution corresponds to half the percentage given.

The proportion of the active ingredient (component a/compounds of the formula I/I-2) in the compositions according to the invention is preferably 50-90% by weight,
further preferably 55-85% by weight, and
more preferably 60-80% by weight.

The proportion of the base (component b 50% suspension in water) in the compositions according to the invention is
preferably 2-40% by weight, (corresponds to 1-20% by weight of pure base)
further preferably 10-30% by weight, (corresponds to 5-15% by weight of pure base) and
more preferably 15-25% by weight (corresponding to 7.5-12.5% by weight of pure base).

The proportion of the dispersant (component c) in the compositions according to the invention is
preferably 1-40% by weight,
further preferably 3-15% by weight, and
more preferably 8-12% by weight.

The proportion of the wetting agent (component d) in the compositions according to the invention is
preferably 0-5% by weight,
further preferably 1-3% by weight, and
more preferably 1.5-2.5% by weight.

The proportion of the water-soluble filler (component e) in the compositions is
preferably 0-25% by weight,
further preferably 0-20% by weight, and
more preferably 0-18% by weight.

In an alternative embodiment, the proportion of the water-soluble filler (component e) in the compositions, where the other constituents are present in the amounts as described in the present application, is preferably 1-25% by weight,
further preferably 5-18% by weight and
more preferably 12-18% by weight.

The proportion of the further water-soluble or liquid active ingredients and adjuvants (component f)—if present—in the compositions according to the invention is (defoamer and sulfuric acid as the pH adjuster)
preferably 0-10% by weight,
further preferably 0.1-8% by weight, and
more preferably 0.1-5% by weight.

In the embodiments specified hereinafter, the proportion of base is always based on the 50% slurry in water, meaning that the proportion of pure base is half as large (see above). Furthermore, the compositions given in the present invention are always directed to compositions in the form of water-soluble granules (SG), unless explicitly stated otherwise.

A preferred embodiment of the invention is compositions comprising components
a) 55-85% by weight
b) 10-30% by weight
c) 3-15% by weight
d) 1-3% by weight
e) 0-25% by weight
f) 0-10% by weight.

A further-preferred embodiment of the invention is compositions comprising components
a) 55-80% by weight
b) 10-30% by weight
c) 3-15% by weight
d) 1-3% by weight
e) 0-20% by weight
f) 0.1-8% by weight.

An even further-preferred embodiment of the invention is compositions comprising components
a) 60-80% by weight
b) 15-25% by weight
c) 8-12% by weight d) 1.5-2.5% by weight
e) 0-18% by weight
f) 0.1-5% by weight.

A preferred alternative embodiment of the invention is compositions comprising components
a) 60-80% by weight
b) 15-25% by weight
c) 8-12% by weight
d) 1.5-2.5% by weight
e) 1-25% by weight
f) 0.1-8% by weight.

A further specific embodiment of the invention is those compositions in which REAX 88b® is used as dispersant and lactose as component e).

A further specific embodiment of the invention is those compositions in which REAX 88b® is used as dispersant and potassium sulfate as component e).

A further specific embodiment of the invention is those compositions in which REAX 88b® is used as dispersant and potassium phosphate as component e).

A further specific embodiment of the invention is those compositions in which REAX 88b® is used as dispersant and Morwet EFW as component d).

A further specific embodiment of the invention is those compositions in which REAX 88b® is used as dispersant and potassium phosphate together with lactose as component e).

A further embodiment of the invention to be emphasized is that of those compositions in which REAX 88b® is used as dispersant and Silcolapse 726R® as antifoam.

A further embodiment of the invention to be emphasized is that of those compositions in which REAX 88b® is used as dispersant and sulfuric acid is used to adjust the pH.

A further embodiment of the invention to be emphasized is that of those compositions in which Silcolapse 726R® is used as antifoam and sulfuric acid is used to adjust the pH.

A further embodiment of the invention to be emphasized is that of those compositions in which REAX 88b® is used as dispersant and Silcolapse 726R® as antifoam, and sulfuric acid is used to adjust the pH.

Suitable active ingredients according to component a) are those as shown in the abovementioned embodiments of formula 1.

Suitable active ingredients of component a) are those as shown in the abovementioned embodiments of formula 1.

Suitable bases (b) in the context of the present invention are inorganic bases, preferably metal hydroxide bases, further preferably alkali metal hydroxides, even further preferably alkali metal hydroxides selected from the group comprising LiOH, NaOH and KOH and more preferably KOH.

Suitable dispersants (c) in the context of the present invention are dispersants selected from the group of the lignosulfonates and salts thereof, preferably selected from the group of lignosulfonates and salts thereof consisting of Borresperse NA, Borresperse 3A, Ultrazine NA, Ufoxane 3A, Vanisperse CB, Marasperse AG, MARASPERSE N 22, MARASPERSE C 21, MARASPERSE CBOS-4, WAFEX CA122 and Borresperse CA from Borregaard; KRAFTSPERSE EDF-350, KRAFTSPERSE 25M, KRAFTSPERSE EDF-450, REAX 100M, REAX 83A, REAX 85A, REAX 88A, REAX 88B, REAX 907, REAX 910, POLYFON H, POLYFON O and POLYFON T from Ingevity; AGRINOL DN 19 and Agrinol C12 from Tembec, further preferably from the group comprising REAX 88A and REAX 88B and more preferably REAX 88B.

Suitable wetting agents (d) in the context of the present invention are wetting agents selected from the group consisting of the sodium salts of alkylated naphthalenesulfonates, for example ®Morwet EFW, and the sodium salts of dioctylsulfosuccinic acid, for example ®Aerosol OTB, and block polymer of propylene oxide and ethylene oxide on ethylenediamine, for example ®Synperonic T 905, preferably selected from the group consisting of sodium salts of alkylated naphthalenesulfonates, for example ®Morwet EFW, and the sodium salts of dioctylsulfosuccinic acid, for example ®Aerosol OTB, and more preferably consisting of the sodium salts of alkylated naphthalenesulfonates, preferably ®Morwet EFW.

Suitable water-soluble fillers (e) in the context of the present invention are fillers selected from the group comprising readily soluble inorganic salts, sugars and urea derivatives, for example lactose, maltodextrin, potassium sulfate, phosphoric salts of the $M_3PO_4$ form where M is preferably an ammonium or alkali metal cation, further preferably ammonium, Na or K, and urea. Further preferably, the fillers are selected from the group comprising sugars and phosphoric salts of the $M_3PO_4$ form where M is preferably an ammonium or alkali metal cation, further preferably ammonium, Na or K, preferably potassium sulfate, lactose and maltodextrin, more preferably potassium sulfate and lactose.

The compositions of the invention optionally comprise further formulation auxiliaries (f), for example optionally substances from the groups of the emulsifiers, the anionic or nonionic wetting agents, the foam inhibitors, for example silicone-based foam inhibitors, the preservatives, the antioxidants, the dyes, acids or alkalis for adjusting the pH and/or the inert filler materials.

Further suitable wetting agents used (component e-3) may be solid wetting agents, anionic and/or zwitterionic wetting agents, sulfonates (sulfosuccinates), sulfates, phosphonates, phosphates and carboxylates, but also alkaline wetting agents (e.g. ®Synperonic T products). They may be selected from the group of solid wetting agents, i.e. those that are not liquid at room temperature, having, for example, waxy, amorphous or crystalline characteristics, for example from the group of the reaction products of alkylene oxides with alkylenepolyamines, the naphthalenesulfonic acids and the group of the sulfosuccinic acid derivatives, and the salts of these groups which may firstly include mono- and diesters of sulfosuccinic acid and salts thereof (sulfosuccinates) and secondly alkylated naphthalenesulfonic acids and salts thereof.

Typical representatives of suitable wetting agents include ®Synperonic T products (block polymers of propylene oxide and ethylene oxide on ethylenediamine), ®Nekal BX (alkylated naphthalenesulfonates), ®Galoryl MT 804 (alkylated naphthalenesulfonates).

Useful foam inhibitors are all substances typically usable for this purpose in agrochemical compositions. Preference is given to silicone oils and magnesium stearate. Particular preference is given to nonionic aqueous polydimethylsiloxane-based emulsions. Useful preservatives include all substances which are typically usable for this purpose in agrochemical compositions of this type. Examples include Preventol® (from Lanxess) and Proxel®.

Useful antioxidants are all substances typically usable for this purpose in agrochemical compositions. Preference is given to butylhydroxytoluene.

Useful dyes are all substances typically usable for this purpose in agrochemical compositions. Examples include titanium dioxide, pigment black, zinc oxide and blue pigments, and also Permanent Red FGR.

pH adjusters used may be any standard acids and bases, such as, for example hydrochloric acid, sulfuric acid, citric acid or sodium hydroxide and potassium hydroxide.

A particularly preferred pH adjuster is sulfuric acid.

The application rate of the formulations according to the invention can be varied within a relatively wide range. It is guided by the respective active ingredients and by the content thereof in the compositions.

With the aid of the compositions according to the invention, the insecticidal active ingredient mixtures can be deployed in a particularly advantageous manner on plants and/or their habitat.

The compositions according to the invention can be used to treat all plants and parts of plants. Plants in this context are understood to include all plants and plant populations, such as desired and unwanted wild plants or crop plants (including naturally occurring crop plants). Crop plants may be plants which can be obtained by conventional breeding and optimization methods or by biotechnological and genetic engineering methods or combinations of these methods, including the transgenic plants and including the plant cultivars which are protectable or non-protectable by plant breeders' rights. Parts of plants shall be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Plant parts also include harvested material and vegetative and generative propagation material, for example cuttings, tubers, rhizomes, shoots and seeds.

Preferably, the compounds of the formula (I) are, following drench or drip application, used against animal pests from the following pest families:

Preference is given from the family of the woolly aphids (Pemphigidae) to: *Eriosoma* spp., *Pemphigus* spp., in crops such as, for example, citrus fruit, pomaceous fruit, stone fruit, leaf vegetables, root and tuber vegetables and ornamental plants.

Preference is given from the family of the grape lice (Phylloxeridae) to: *Phylloxera* spp. in grapevines, nuts, citrus fruit.

Preference is given from the family of the jumping plant lice (Psyllidae) to: *Psylla* spp., *Paratrioza* spp., *Tenalaphara* spp., *Diaphorina* spp., *Trioza* spp., in crops such as, for example, pomaceous fruit, stone fruit, citrus fruit, vegetables, potatoes, in tropical crops.

Preference is given from the family of the soft scales (Coccidae) to: *Ceroplastes* spp., *Drosicha* spp., *Pulvinaria* spp., *Protopulminaria* spp., *Saissetia* spp., *Coccus* spp., in perennial crops such as, for example, citrus fruit, pomaceous fruit, stone fruit, olives, grapevines, coffee, tea, tropical crops, ornamental plants, vegetables.

Preference is given from the family of the armoured scale insects (Diaspididae) to: *Quadraspidiotus* spp., *Aonidiella* spp., *Lepidosaphes* spp., *Aspidiotus* spp., *Aspis* spp., *Diaspis* spp., *Parlatoria* spp., *Pseudaulacaspis* spp., *Unaspis* spp., *Pinnaspis* spp., *Selenaspidus* spp., in crops such as, for example, citrus fruit, pomaceous fruit, stone fruit, almonds, pistachios, nuts, olives, tea, ornamental plants, grapevines, tropical crops.

Preference is given from the family of the ensign scales (Ortheziidae) to: *Orthezia* spp. in citrus fruit, pomaceous fruit, stone fruit.

Preference is given from the family of the mealy bugs (Pseudococcidae) to: *Pericerga, Pseudococcus* spp., *Planococcus* spp., *Dysmicoccus* spp., in crops such as, for example, citrus fruit, stone fruit and pomaceous fruit, tea, grapevines, vegetables, ornamental plants and tropical crops.

Preference is furthermore given from the family of the whiteflies (Aleyrodidae) to: *Bemisia tabaci, Bemisia argentifolii, Trialeurodes vaporariorum, Aleurothrixus floccosus, Aleurodes* spp., *Dialeurodes* spp., *Parabemisia myricae* in crops such as, for example, vegetables, melons, potatoes, tobacco, soft fruit, citrus fruit, ornamental plants, cotton, soya beans and tropical crops.

Moreover, preference is given from the family of the aphids (Aphidae) to:

*Myzus* spp. in tobacco, stone fruit, soft fruit, fruit vegetables, leafy vegetables, tuber and root vegetables, melons, potatoes, ornamental plants, spices,

*Acyrthosiphon onobrychis* in vegetables,

*Aphis* spp. in tobacco, citrus fruit, pomaceous fruit, stone fruit, melons, strawberries, soft fruit, fruit vegetables, leafy vegetables, tuber, stem and root vegetables, ornamental plants, potatoes, pumpkins, spices,

*Rhodobium porosum* in strawberries,

*Nasonovia ribisnigri* in leafy vegetables,

*Macrosiphum* spp. in ornamental plants, potatoes, leafy vegetables and fruit vegetables, strawberries,

*Phorodon humuli* in hops,

*Brevicoryne brassicae* in leafy vegetables,

*Toxoptera* spp. in citrus fruit, stone fruit, almonds, nuts, spices,

*Aulacorthum* spp. in citrus fruit, potatoes, fruit vegetables and leafy vegetables,

*Anuraphis cardui* in vegetables,

*Brachycaudus helycrisii* in sunflowers,

*Acyrthosiphon onobrychis* in vegetables.

Likewise, preference is given from the family of the *thrips* (Thripidae) to: *Anaphothrips* spp., *Baliothrips* spp., *Caliothrips* spp., *Frankliniella* spp., *Heliothrips* spp., *Hercinothrips* spp., *Rhipiphorothrips* spp., *Scirtothrips* spp., *Kakothrips* spp., *Selenothrips* spp. and *Thrips* spp., in crops auch as, for example, fruit, cotton, grapevines, tea, nuts, tropical crops, ornamental plants, conifers, tobacco, spices, vegetables, soft fruit, melons, citrus fruit and potatoes.

Moreover, preference is given from the families of the leaf-miner flies (Agromyzidae) and root-maggot flies (Anthomyiidae) to: *Agromyza* spp., *Amauromyza* spp., *Atherigona* spp., *Chlorops* spp., *Liriomyza* spp., *Oscinella* spp., *Pegomyia* spp. in crops such as, for example, vegetables, melons, potatoes, nuts, ornamental plants.

Preference is given from the families of the leafhoppers (Cicadellidae) and planthoppers (Delphacidae) to: Circulifer spp., Dalbus spp., *Empoasca* spp., *Erythroneura* spp., *Homalodisca* spp., *Iodioscopus* spp., *Laodelphax* spp., *Nephotettix* spp., *Nilaparvata* spp., *Oncometopia* spp., *Sogatella* spp., in crops such as, for example, citrus fruit, fruit, grapevines, potatoes, vegetables, ornamental plants, conifers, melons, soft fruit, tea, nuts, rice and tropical crops.

Preference is given from the family of the leaf-miner moths (Gracillariidae) to:

*Caloptilia* spp., *Gracillaria* spp., *Lithocolletis* spp., *Leucoptera* spp., *Phtorimaea* spp., *Phyllocnistis* spp. in crops such as pomaceous fruit, stone fruit, grapevines, nuts, citrus fruit, conifers, potatoes, coffee.

Preference is given from the family of the gall midges (Cecidomyiidae) to:

Contarinia spp., Dasineura spp., Diplosis spp., Prodiplosis spp., Thecodiplosis spp., Sitodiplosis spp., Haplodiplosis spp. in crops such as citrus fruit, pomaceous fruit, stone fruit, vegetables, potatoes, spices, soft fruit, conifers, hops.

Likewise, preference is given from the family of the fruit flies (Tephritidae) to:

Anastrepha spp., Ceratitis spp., Dacus spp., Rhagoletis spp. in crops such as vegetables, soft fruit, melons, pomaceous and stone fruit, ornamental plants, potatoes, grapevines, tropical crops, citrus fruit, olives.

Moreover, preference is given to mites from the families of the spider mites (Tetranychidae) and the gall mites (Eriophydae):

Tetranychus spp., Panonychus spp., Aculops spp. in crops such as vegetables, potatoes, ornamental plants, citrus fruit, grapevines, conifers.

The inventive treatment of the plants and parts of plants with the compositions according to the invention is effected directly or by allowing the combinations to act on the surroundings, environment or storage space by the customary treatment methods, for example by drenching, immersion, spraying, evaporation, fogging, scattering, painting on and, in the case of propagation material, in particular in the case of seeds, also by applying one or more coats.

The active ingredient is preferably applied by watering onto the soil. Alternatively, the active ingredient is applied by drip application.

Preferably, the plant to be treated is selected from the group consisting of cotton, soya beans, tobacco, vegetables, spices, ornamental plants, conifers, citrus plants, fruit, tropical crops, nuts and grapevines.

Preferably, the composition according to the invention acts against pests from the families of the woolly aphids, grape lice, jumping plant lice, soft scales, armoured scale insects, ensign scales, mealy bugs, whiteflies, aphids, thrips, leafhoppers, planthoppers, leaf-miner flies, gall midges, fruit flies, leaf-miner moths, spider mites, gall mites.

It has also been found that the compositions according to the invention can be produced by a process having the steps of:

1) mixing the active ingredient (a) with the base (b) and the dispersant (c) and optionally further constituents d-e, or in the alternative embodiment d-f, in water;
2) spray-drying the mixture.

Alternatively, the mixture can also be dried by the fluidized bed method or by other methods known to the person skilled in the art in the field.

Relevant equipment for the mixing and spray drying is known to those skilled in the art.

This process too forms part of the subject-matter of the invention.

Finally, it has been found that the compositions according to the invention are of very good suitability for application of the active agrochemical ingredients present to plants and/or the habitat thereof. This process too forms part of the subject-matter of the invention.

The examples which follow illustrate the subject-matter of the invention without limiting it.

Production:

By dissolving the active ingredient together with aqueous alkali and a suitable drying method, it is possible to produce a solid formulation having a very high active ingredient content (>50%).

Compound I-2 was mixed together with potassium hydroxide, a binder and optionally further additives in amounts as specified in Tab. 1 in water while stirring and then dried by means of spray drying (LabPlant Model SprayDryer SD-05, air feed temperature 190° C., air exit temperature 50-60° C., air throughput 48 m³/h).

TABLE 1

| Experiment No. | 1 | 2 | 3 | 4 | 5 | 6 | 7 | 8 | 9 | 10 | 11 | 12 | 12a | 13 | 14 | 15 |
|---|---|---|---|---|---|---|---|---|---|---|---|---|---|---|---|---|
| Comment | | | | | | | | | | | | | | | Comparative Examples | |
| I-2/g | 135 | 311 | 311 | 10 | 186.6 | 186.6 | 140 | 135.4 | 138.2 | 57.4 | 57.4 | 56 | 66.5 | 10 | 72.2 | 66 |
| KOH (50%)/g | 41.6 | 95.8 | 94.1 | 2.5 | 57.5 | 57.5 | 32 | 37.5 | 34.2 | 15.5 | 16.4 | 15.5 | 20.8 | — | 13.4 | 18.3 |
| Reax 88B/g | 27 | 62.2 | — | 2 | 31.3 | 17 | 10 | 9.7 | 9.9 | 10.1 | 10 | 11.5 | 9 | 2 | 5.2 | — |
| Reax 88A/g | — | — | 61.1 | — | — | — | — | — | — | — | — | — | — | — | — | — |
| K$_3$PO$_4$/g | — | 31.1 | 31.1 | 1 | 18.7 | 37.3 | 14 | 13.5 | 13.8 | — | — | — | — | 5.8 | 7.2 | — |
| Lactose/g | — | — | — | — | — | — | — | — | — | 15 | 14.7 | — | — | — | — | — |
| K$_2$SO$_4$/g | — | — | — | — | — | — | — | — | — | — | — | 15 | — | — | — | 14.2 |
| Morwet EFW/g | — | — | — | — | 6 | — | 4 | 3.9 | 3.9 | 2 | 1.5 | 2 | 2 | — | 2.1 | 1.5 |
| Silcolapse 426 R | | | | | | | | | | | | | 0.2 | | | |
| Sulfuric acid 25% | | | | | | | | | | | | | 1.5 | | | |
| Water/g | 250 | 632 | 632 | 20.1 | 380 | 380 | 260 | 253 | 257 | 131 | 130 | 130 | 108.1 | 71.3 | — | — |
| Mol. ratio A.I./KOH | 1:1 | 1:1 | 1:0.9 | 1:0.8 | 1:1 | 1:1 | 1:0.75 | 1:0.9 | 1:0.8 | 1:0.9 | 1:0.95 | 1:0.9 | 1:1 | 1:0 | 1:0.6 | 1:0.9 |
| Dissolution level (5% w/v solution)/% | | | | | | | 99.9 | 100 | 99.9 | 99.7 | 99.2 | 99.9 | 99.9 | | 96.1 | 96.6 |
| Result | + | + | + | + | + | + | + | + | + | + | + | + | + | − | − | − |

Comparative example 13-15 show that it is not possible to achieve sufficient solubility when the base content is too low and the dispersant is absent.

Determination of Solubility and Dissolution Rates:
Determination of Dissolution Level:

Formulation and water are introduced into a closable 250 ml measuring cylinder at 25° C., mixed by inverting the closed measuring cylinder 15 times and, after being left to stand for 5 minutes, poured through a 40 µm sieve. The amount of residue is ascertained to determine the dissolution level.

The percentage residue is calculated using the following formula:

$$\text{Residue} = \frac{w_1 \cdot 100}{w_0} [\%]$$

where:
$w_1$=amount of residue on the sieve [g]
$w_0$=starting weight [g]
100=percentage factor [%]

The percentage residues after 5 minutes (Residue[5 min]) are determined.

Dissolution level=100−Residue[5 min][%]

Solubility:

20 g of the composition according to Example 3 were fully dissolved in 50 g of water while stirring at room temperature. The result is a deeply dark-coloured, clear solution.

Dissolution Rate:

11.4 mg of formulation according to the invention were dissolved while stirring in 200 ml of water under various conditions (water hardness & pH), and the mixture was assessed visually over 24 h. "Dissolved" means that the solution was clear and no undissolved solids were present any longer. The results are shown in table 2.

|   | Example | Medium | pH of the solution | Target a.i. in 300 l of H₂O [g] | Starting weight of formulation [mg] | Assessment of dissolution characteristics after | | | | | |
|---|---|---|---|---|---|---|---|---|---|---|---|
|   |   |   |   |   |   | 0 min | 30 sec | 5 min | 30 min | 1 h | 24 h |
| A | 3 | 500 ppm H₂O | 6.8 | 12 | 11.4 | not dissolved | dissolved | dissolved | dissolved | dissolved | dissolved |
| B |   | Buffer 1 | 6.0 | 12 | 11.4 | not dissolved | dissolved | dissolved | dissolved | dissolved | dissolved |
| C |   | Buffer 2 | 7.9 | 12 | 11.4 | not dissolved | dissolved | dissolved | dissolved | dissolved | dissolved |
| D | 2 | 500 ppm H₂O | 7.5 | 12 | 11.4 | not dissolved | dissolved | dissolved | dissolved | dissolved | dissolved |
| E |   | Buffer 1 | 6.0 | 12 | 11.4 | not dissolved | dissolved | dissolved | dissolved | dissolved | dissolved |
| F |   | Buffer 2 | 7.9 | 12 | 11.4 | dissolved | dissolved | dissolved | dissolved | dissolved | dissolved |
| G | 2 | 500 ppm H₂O | 7.6 | 24 | 22.9 | not dissolved | dissolved | dissolved | dissolved | dissolved | dissolved |
| H |   | Buffer 1 | 6.0 | 24 | 22.9 | not dissolved | dissolved | dissolved | dissolved | dissolved | dissolved |
| I |   | Buffer 2 | 8.0 | 24 | 22.9 | not dissolved | dissolved | dissolved | dissolved | dissolved | dissolved |
| J | 2 | 500 ppm H₂O | 8.4 | 48 | 45.7 | not dissolved | dissolved | dissolved | dissolved | dissolved | dissolved |
| K |   | Buffer 1 | 6.0 | 48 | 45.7 | not dissolved | dissolved | dissolved | dissolved | dissolved | dissolved |
| L |   | Buffer 2 | 8.0 | 48 | 45.7 | not dissolved | not dissolved | dissolved | dissolved | dissolved | dissolved |

|   | Example | Medium | pH | Dissolution level (5% w/v Solution) [%] | Visual assessment of dissolution characteristics after 5 min |
|---|---|---|---|---|---|
| M | 12a | Water Cipac A | — | 99.9 | dissolved |
| N |   | Water Cipac C | — | 99.8 | dissolved |
| O |   | Water Cipac D | — | 99.7 | dissolved |
| P |   | Buffer 3 | 4.7 | 99.6 | dissolved |
| Q |   | Buffer 4 | 10 | 99.8 | dissolved |

Comparison

| No. | Formulation type | solution | pH of the solution | Target a.i. in 300 l of H₂O [g] | Starting weight of formulation [g] | Assessment of dissolution characteristics after | | | | | |
|---|---|---|---|---|---|---|---|---|---|---|---|
|   |   |   |   |   |   | 0 min | 30 sec | 5 min | 30 min | 1 h | 24 h |
| A | SL050 | 500 ppm H₂O | 6.6 | 12 | 0.08 | dissolved | dissolved | dissolved | dissolved | dissolved | dissolved |
| B |   | Buffer | 6.0 | 12 | 0.08 | dissolved | dissolved | dissolved | dissolved | dissolved | dissolved |
| C |   | Buffer | 8.0 | 12 | 0.08 | dissolved | dissolved | dissolved | dissolved | dissolved | dissolved |
| D | SC050 | 500 ppm H₂O | 5.3 | 12 | 0.08 | not dissolved | not dissolved | not dissolved | not dissolved | not dissolved | not dissolved |

-continued

| No. | Formulation type | pH of the solution | Target a.i. in 300 l of H₂O [g] | Starting weight of formulation [g] | Assessment of dissolution characteristics after | | | | | |
|---|---|---|---|---|---|---|---|---|---|---|
| | | | | | 0 min | 30 sec | 5 min | 30 min | 1 h | 24 h |
| E | Buffer | 6.0 | 12 | 0.08 | not dissolved | not dissolved | not dissolved | not dissolved | not dissolved | not dissolved |
| F | Buffer | 8.0 | 12 | 0.08 | not dissolved | not dissolved | dissolved | dissolved | dissolved | dissolved |
| G | SL050 | 500 ppm H₂O | 6.6 | 6 | 0.04 | dissolved | dissolved | dissolved | dissolved | dissolved | dissolved |
| H | Buffer | 6.0 | 6 | 0.04 | dissolved | dissolved | dissolved | dissolved | dissolved | dissolved |
| I | Buffer | 8.0 | 6 | 0.04 | dissolved | dissolved | dissolved | dissolved | dissolved | dissolved |
| J | SC050 | 500 ppm H₂O | 5.4 | 6 | 0.04 | not dissolved | not dissolved | not dissolved | not dissolved | not dissolved | not dissolved |
| K | Buffer | 6.0 | 6 | 0.04 | not dissolved | not dissolved | almost dissolved | almost dissolved | almost dissolved | almost dissolved |
| L | Buffer | 8.0 | 6 | 0.04 | not dissolved | dissolved | dissolved | dissolved | dissolved | dissolved |

As apparent from the comparative experiments with the SL and SC 050 formulation, the formulation according to the invention, at lower pH (6), dissolves better in water than the SC formulation with the same active ingredient content. Moreover, true solutions with a higher active ingredient content are obtained (up to 48 g/300 l).

The SC formulations were produced as follows:

Sc Formulation:

To prepare a suspension concentrate, all liquid components are first mixed with one another. In the next step, the solids are added and stirred until a homogeneous suspension is obtained. The homogeneous suspension is subjected first to a coarse and then to a fine grinding operation, so as to obtain a suspension in which 90% of the solid particles have a particle size below 10 μm. Subsequently, Kelzan® S and water are added while stirring at room temperature to attain the defined viscosity. A homogeneous suspension concentrate is obtained. A typical composition of a further SC formulation is:

49 g of the compound of formula I-2 (active ingredient)
15 g of Soprophor® TS 54
45 g of Atlox® 4913
100 g of glycerol (99%)
1 g of citric acid
1 g of Silfoam® SRE
1.2 g of Proxel® GXL
0.8 g of Preventol® D7
1.2 g of Kelzan® S
785.8 g of water SL Formulation:

The SL formulation is produced using an initial charge of water, the active ingredient (I-2) and urea. 2 molar sodium hydroxide solution is added until everything has gone into solution, and then the pH is adjusted to 10 with 1 molar hydrochloric acid and the mixture is made up to 1 l with water.

A typical composition of an SL formulation was:

50 g of the compound of the formula (active ingredient)
51.35 g of sodium hydroxide solution (2 m)
51.35 g of hydrochloric acid (1 m)
102.7 g of urea
0.82 g of Preventol® D7
1.23 g of Proxel® GXL 20%
1.03 g of Silfoam® SRE
768.5 g of water Biological Efficacy:

In a greenhouse, the biological activity of two SG formulations (Example 2, 3, 12a) were compared by comparison with a SC 225 after drench application against *Myzus persicae* on bell peppers:

Application: drench volume 50 ml, soil application 7 days after planting
Rate: 0.5; 1; 2 mg a.i./l of soil
Soil: standard BI soil (pH 6.8)
Soil moisture content: ~10% w/w
Soil volume: 0.5 l pot per plant
Infestation: 1 week after application At the application rate used and under the test conditions specified, the formulations according to the invention and the SC showed complete control of *Myzus persicae*.

The invention claimed is:

1. A solid composition in the form of water-soluble granules (SG) comprising:
   a. 55% to 85% by weight of a tetramic acid derivative of formula (I-2)

b. 15% to 30% by weight of at least one base selected from the group consisting of LiOH, NaOH, and KOH,
   c. 3% to 15% by weight of at least one dispersant selectd from the group consisting of lignosulfonates and salts thereof,
   d. 1% to 3% by weight of at least one wetting agent,
   e. 0-25% by weight of at least one water-soluble filler, and
   f. 0% to 10% by weight of further water-soluble or liquid active ingredients and adjuvants, wherein the molar ratio of component (a) to (b) is in the range from 1.0:1.0 to 1.0:0.75.

2. The composition according to claim 1, wherein
d. is at least one wetting agent selected from the group consisting of the sodium salts of alkylated naphthalenesulfonate.
3. The composition of claim 1, comprising, as
a. the compound having the formula (I-2) having the following structure:

(I)

(I-2)

b. KOH,
c. sodium lignosulfonates,
d. a wetting agent selected from the group consisting of the sodium salts of alkylated naphthalenesulfonates,
e. optionally a water-soluble filler selected from the group consisting of sugars,
f. further water-soluble or liquid active ingredients and adjuvants.
4. The composition of claim 1, comprising, as
a. the compound having the formula (I-2) having the following structure:

(I)

(I-2)

b. KOH,
c. sodium lignosulfonates,
d. a wetting agent selected from the group consisting of the sodium salts of alkylated naphthalenesulfonates,
e. a water-soluble filler selected from the group consisting of sugars,
f. optionally further water-soluble or liquid active ingredients and adjuvants.
5. The composition of claim 1, wherein the molar ratio of active ingredient to base (component (a) to (b)) is in a range from 1.0:1.0 to 1.0:0.9.
6. The composition of claim 1, wherein components a-f are present as follows:
a) 55-80% by weight
b) 15-30% by weight
c) 3-15% by weight
d) 1-3% by weight
e) 0-20% by weight
f) 0.1-8% by weight.
7. A process for producing a composition according to claim 1, wherein the formulation is effected by mixing the components and then spray-drying.
8. A method for controlling insects on one or more plants and/or a habitat thereof comprising applying a composition according to claim 1 to the one or more plants and/or a habitat thereof.
9. An insecticidal product comprising a composition according to claim 1 for controlling insects.
10. The composition of claim 1, comprising a tetramic acid derivative of the formula (I-2)

(I-2)

b. at least one base selected from the group consisting of KOH and NaOH,
c. at least on dispersant selected from the group of the lignosulfonates and salts thereof,
d. at least one wetting agent selected from the group consisting of the sodium salts of alkylated naphthalenesulfonates and the sodium salts of dioctylsulfosuccinic acid,
e. optionally at least one water-soluble filler selected from the group consisting of readily soluble inorganic salts, sugars and urea derivatives, and
f. further water-soluble or liquid active ingredients and adjuvants.

* * * * *